(Model.)

A. N. LINDSLEY.
GLASS GLOBE AND SHADE FOR GAS FIXTURES.

No. 273,371. Patented Mar. 6, 1883.

WITNESSES:
Andrew Wilson.
Joseph C. Watson.

INVENTOR
Augustus N Lindsley
BY
ATTORNEY

UNITED STATES PATENT OFFICE.

AUGUSTUS N. LINDSLEY, OF NEW YORK, N. Y., ASSIGNOR OF ONE-HALF TO HENRY PIKE, OF SAME PLACE.

GLASS GLOBE AND SHADE FOR GAS-FIXTURES.

SPECIFICATION forming part of Letters Patent No. 273,371, dated March 6, 1883.

Application filed July 7, 1882. (Model.)

*To all whom it may concern:*

Be it known that I, AUGUSTUS N. LINDSLEY, of the city, county, and State of New York, have invented an Improvement in Glass Globes and Shades for Gas-Fixtures, of which the following is a specification.

Figure 1:
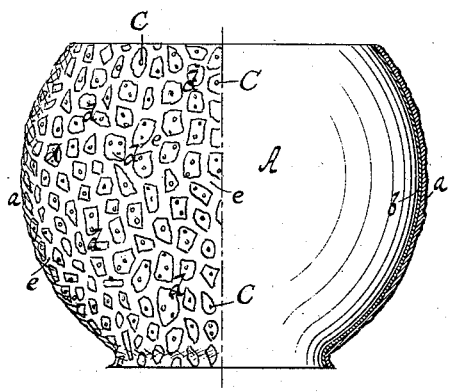
Figure 2:
Figure 3:
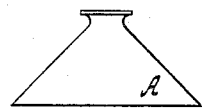
Figure 4:
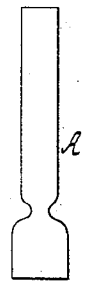
Figure 5:
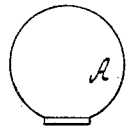
Figure 6:

The drawings represent, in Figure 1, a glass globe, and in Fig. 2 a dome-shaped glass shade, and in Fig. 3 a conical-shaped glass shade, all being for use on gas-fixtures. Fig. 4 represents a lamp-chimney for use on kerosene or similar lamps, and Figs. 5 and 6 represent globes suitable for use on the electric light. Fig. 1 also shows a vertical sectional view of a gas-globe, showing the two coatings or layers of glass of which some shades and globes may be made.

Similar letters of reference designate similar parts in all drawings.

A is the globe or shade.

$d$ is the crackle on the outer surface, and C C C are small particles of fancy-colored glass or amber or other material of similar nature and having the quality of transparency.

$b$ and $a$ are the two layers or coatings of glass as used in some cases in the manufacture of shades and globes according to my invention.

The glass from which I makes these shades or globes I term "opalescent mottled crackled glass;" and the object of this invention is to remedy the defects existing in gas-light when globes and shades of the ordinary glass are used. I destroy and modify the yellowish tint to the gas-light. I increase the amount of light in the room, and I produce a clear white light from a gas-flame, greatly resembling the electric light in whiteness.

The various colors and tints of which I am able to make these shades and globes enable me to complete the furnishing of a room in any required tint or shade to match the furniture or trimming, painting, or paper.

The object of these shades and globes is, also, to obtain opalescent and iridescent effects, to insure a greater translucency of the globes used in gas-fixtures, and lessen complete transparency, which is very undesirable, as in the case of ordinary plain glass globes or shades. The glass employed by me also softens the light, and, by reason of its unevenness of structure and formation, the direct passage of rays of light and the tendency of the said rays to focus are prevented.

By my invention globes and shades for gas-fixtures possessing the advantageous qualities hereinbefore referred to may be made at less cost than by the use of any quality of stained or colored glass. These effects upon the gas-light and colors in the shades and globes are greater than can be gained in any other way known to me. Even the use of very expensive materials, as mother-of-pearl or thin laminæ of precious stones—such as onyx and alabaster—would not produce the same results, nor could they be employed in the manufacture of my globes or shades.

I have aimed in my invention to overcome a serious objection to gas-light, which is its yellowish tint, and also to increase the beauty of gas-fixtures, by enabling parties to use any colored globe or shade desired to match the furniture or decorations in the room, and thereby increase the use of colored glass globes and shades and give additional variety and beauty to public edifices and private dwellings, and by experiments I have discovered that this opalescent mottled crackled glass may be used for gas-fixtures or kerosene-lamps or for any light, whereby the yellowish tint will be modified or destroyed, opalescent and iridescent effects produced, and beauty and variety given to the room or place where used.

Opal glass, as at present improved and refined and employed in articles for table use and boxes, is not for use in shades and globes for gas-fixtures as desirable and pleasing as to its effects of color as the more transparent quality which was first made. This opal glass will be more or less opaque or milky in parts, according to the proportion of the insoluble mass deposited or contained in it. This effect is usually produced with peroxide of tin or stannic acid, antimoniac acid, chloride of silver, phosphate of lime, or bone-ashes. These different materials, mixed with the usual sand and potash, or with powdered glass, give a white precipitate, consequently a glass of a milky or yellowish white. By regulating the quantities of these materials the glass may be made translucid or absolutely opaque; but the latter would not answer for my purpose.

I am enabled by checking or graduating the amount of light in this way to gain effects as to depth, softness, and modulation of color which have not been before gained by the use of colored glass alone, and globes or shades made in accordance with my invention may, by the use of opalescent mottled crackled glass, be made to show a variety of colors and shades of colors, not before gained by transparent glass.

The opal glass in its customary form has such a dead-white color that in appearance it closely resembles porcelain, and can be employed as a substitute for it.

What I term "mottled" glass is made by sprinkling upon the glass, while in a heated or molten state, fine particles of colored glass or amber, or any other material which will adhere to glass in a heated state, and which particles are capable of being melted, as hereinafter set forth.

The crackle in my globes and shades is produced by dipping the glass, while in a heated state, in cold water.

The operation in the manufacture of my globes or shades is as follows: I take out a quantity of molten glass, while at a very high temperature, on the end of an ordinary blow-pipe, and by skillful handling and manipulation roll it in a ball somewhat resembling an egg in form. This glass is made in the usual way and tinted in its manufacture with any shade of color of which I desire to make my globe or shade. If desired, I then immerse this egg-shaped mass of glass into another vessel of heated glass of a different shade or tint, and by again manipulating the mass I secure a solid compact mass of these two layers or coatings of glass. I then sprinkle upon this glass a quantity of fine particles of broken colored glass, amber, or other like material, which will adhere to this mass, and which can be subsequently melted by application of heat. I then quickly and for an instant immerse the mass of glass, with the particles, in cold water. This produces the crackle in glass on its outer surface. This crackle is a dividing or cracking of the glass partly through. It causes a contraction of the glass on its outer surface, and at the same time the formation of slight elevations, with numerous channels or divisions running around and through the elevated places. By means of this crackling the small particles of glass and other material are taken out of the cracks or channels and retained upon the elevated parts, thus leaving the channels or cracks perfectly plain and smooth and clear. Another great result produced by these globes by means of the crackle is the concentration of light at those points, the crackle being thinner than the surrounding elevations, and these latter being somewhat thick, and much thicker and denser than the crackle, there is an effect very much the same as in glass known as a "bull's-eye," which is used to produce strong and concentrated light. The unevenness of the inner surface of the globe also tends to increase the bull's-eye effect. After this I again introduce the mass of glass, with the particles sprinkled thereon and now crackled, into a furnace to be reheated and to melt the sprinkled particles, and I take it out when the particles are melted, cut it into the desired form for a globe or shade, and it is ready for sale.

It is evident that the size of the globe or shade depends entirely upon the quantity of molten glass that is taken out for the purpose.

I have described a globe or shade of two layers or coatings; but I do not confine myself to that method. I can use only one layer of glass, if desired. Double layers increase the beauty of the globe and the effect of the light and the shades of colors reflected through. I can also use more than two layers of glass, where necessary, applying each layer upon the preceding one in a molten or heated state.

The sprinkling of fine particles is shown in the drawings by the letters C C C and the crackle by the letter $d$.

The beauty and usefulness of these globes is greatly enhanced by the coloring, tints, or shades which may be mixed with and used in the manufacture of opal glass. In this way I am enabled to gain effects as to depth, softness, and modulation of color which have not been before gained by the use of plain or colored glass.

I do not confine myself to any specified tint or color, but can make the globes and shades to match any color to complete the furnishing of the room or correspond with parts thereof.

I claim as new—

1. The method herein described of manufacturing ornamental articles of glass, the same consisting in sprinkling particles of broken colored glass on the article while hot and partially formed, heating the article to cause the particles to adhere, then immerse the article in cold water to crackle the same, and finally reheating and forming the article into the desired shape.

2. As a new article of manufacture, a lamp shade or globe having small particles of colored glass attached to and made of the external surface and with crackled lines, as set forth.

AUGUSTUS N. LINDSLEY.

Witnesses:
JAMES P. FOSTER,
ANDREW WILSON.